(No Model.)

J. A. HUNT.
BICYCLE TOOL BAG.

No. 516,724. Patented Mar. 20, 1894.

Witnesses

Inventor
Jonathan A. Hunt,
By Attorney
John C. Dewey.

THE NATIONAL LITHOGRAPHING COMPANY,
WASHINGTON, D. C.

UNITED STATES PATENT OFFICE.

JONATHAN A. HUNT, OF WESTBOROUGH, MASSACHUSETTS, ASSIGNOR TO THE HUNT MANUFACTURING COMPANY, OF SAME PLACE.

BICYCLE TOOL-BAG.

SPECIFICATION forming part of Letters Patent No. 516,724, dated March 20, 1894.

Application filed November 4, 1893. Serial No. 490,043. (No model.)

*To all whom it may concern:*

Be it known that I, JONATHAN A. HUNT, a citizen of the United States, residing at Westborough, in the county of Worcester and State of Massachusetts, have invented certain new and useful Improvements in Bicycle Tool-Bags; and I do hereby declare that the following is a full, clear, and exact description thereof, which, in connection with the drawings making a part of this specification, will enable others skilled in the art to which my invention belongs to make and use the same.

My invention relates to bicycle tool bags, or to bags used in connection with bicycles to carry the wrench, oiler, pneumatic pump, &c., and the object of my invention is to improve upon the construction of a bicycle tool bag as now ordinarily made, consisting of a square or round telescopic bag made in two parts, and to provide a tool bag of simple and inexpensive construction, which will hold more than the ordinary tool bag, and which is adapted to be attached to the bicycle frame, and to be opened to obtain access to the contents of the bag, without removing the same from the frame.

My invention consists in certain novel features of construction and operation of a bicycle tool bag, as will be hereinafter fully described.

Figure 1:
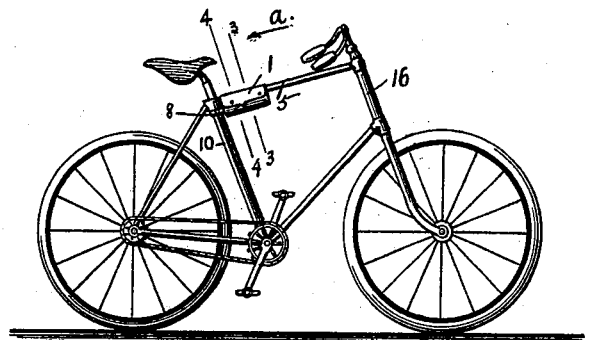
Figures 2, 3:
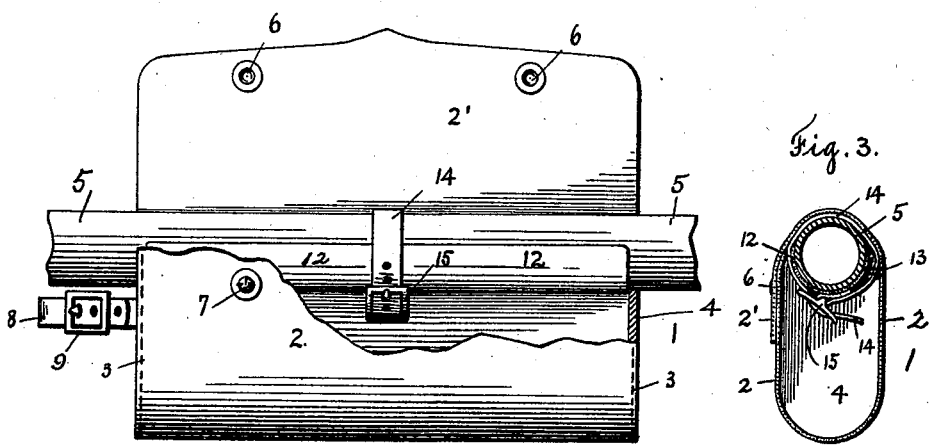
Figures 4, 5:
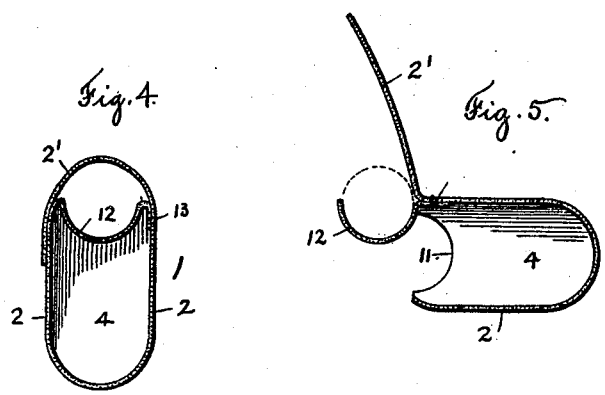

Referring to the drawings:—Figure 1 is a side view of a bicycle showing my improved bicycle tool bag attached to the upper cross rod of the frame. Fig. 2 is a front view of the bicycle tool bag, showing the same attached to the top cross bar of the bicycle frame with the flap cover raised, and the front side of the bag broken away. Fig. 3 is a cross section of the tool bag, on line 3, 3, Fig. 1, looking in the direction of arrow *a*, same figure. Fig. 4 is a section on line 4, 4, Fig. 1, looking in the direction of arrow *a*, same figure, with the rod removed. Fig. 5 corresponds to Fig. 4, but shows the flap cover open, and the bag pushed back away from its support to give ready access to the contents thereof. Figs. 1 to 5 inclusive, are on an enlarged scale.

In the accompanying drawings, 1 is my improved bicycle tool bag, which in this instance is shown in Figs. 1 and 2, attached to the upper cross rod, and also to the rear vertical rod of the bicycle frame.

The bag 1 is preferably made in substantially the shape shown in the drawings, with a rounded bottom, and closed sides and ends, and open at the top, and consists preferably of one piece of leather 2, or other material, with pieces of leather or other material attached to the side edges thereof, preferably by stitching 3, as shown in Fig. 2, to form the ends 4 of the bag. The leather 2, or other material of which the bag is made, extends above the rear of the body of the bag, and forms the flap cover 2′, which is adapted to extend over and cover the upper open end of the bag, and also to extend over and cover the upper or outer portion of the cross rod 5 of the bicycle frame to which the bag is attached. The flap cover 2′ is provided in this instance with sockets 6, adapted to be secured to the buttons 7 attached to the front side of the body of the bag. One end of the bag 1 is provided with a strap 8, and buckle 9, or other equivalent means for connecting the bag with the vertical rod 10 of the bicycle frame to hold the bag 1 in place on the cross rod 5.

The upper portion of the ends 4 of the bag are preferably made curved or recessed, as shown at 11, Fig. 5, to receive the cross rod 5.

The flap cover 2′ when closed and extending over the upper or outer portion of the cross rod 5, serves to retain the bag 1 on said rod; but when the flap cover is open, the bag will be free to drop off of said rod, and in order to prevent the bag from dropping off of, or becoming detached from the rod 5, when the flap cover 2′ is open, I preferably combine with the bag 1, a fastening device or means located inside of the bag for securing the same to the cross rod 5, or other portion of the frame, independently of the flap cover 2′.

I have shown in the drawings, a supplemental flap 12, preferably made of the same material as the bag 1 is made of, and attached at its inner edge by stitching 13, as shown in Figs. 4 and 5, or otherwise, along the rear upper portion of the body of the bag. The supplemental flap 12 is in this instance made of a length equal to the inside length of the bag, and of a width sufficient to encircle the lower or inner half of the cross rod 5, as shown in the drawings. Said flap 12 furnishes a supplemental cover to close the open top of the bag 1, and prevent the contents of the bag from rubbing or injuring the enamel or finish on the under or inner side of the cross rod 5. A strap 14, secured to the attached side of the flap 12, or to the body of the bag, is adapted to encircle and extend over the upper or outer portion of the cross rod 5 within the bag and buckle into a buckle 15 on the other end of the strap 14, to hold the rod 5 in the flap 12, and also to secure the bag 1 to the rod 5 so that the same will be maintained in position thereon when the flap cover 2' is open, as shown in Fig. 2.

The strap 14, or other equivalent fastening device, secured to the bag 1, and adapted to encircle the rod 5, with the portion thereof encircling the rod 5, located within the bag, may be employed to secure the bag to the cross rod 5, independently of the flap cover 2', and without the supplemental flap 12, if desired.

When the bag 1 is in position, and secured to the cross rod 5, and the flap cover 2' opened, the bag itself may be pushed back away from the detached portion thereof, to give free access to the contents of the bag, as shown in Fig. 5.

The advantages of my improvements in bicycle tool bags will be readily appreciated by those skilled in the art.

I provide a bag of simple and inexpensive construction, which will hold more than the ordinary telescopic tool bag, and which is provided with an inside fastening device, or means located within the bag, for securing it to the rod of the bicycle frame, independently of the flap or cover, so that the smooth and even surface of the back of the bag will not be broken by straps or fastening devices located on the outside of the bag, for securing the bag to the supporting rod.

I have shown in the drawings, Fig. 1, my improved bicycle tool bag attached to the upper cross rod of the frame, at the lower end thereof, but it will be understood that it may be attached at the upper end of said cross rod, or it may be attached on one of the vertical rods 16, or 10, if preferred.

Instead of sockets and buttons for securing the flap cover of the bag to the body thereof, ordinary straps and buckles may be used.

It will be understood that the details of construction of my improved bicycle tool bag may be varied somewhat if desired.

Having thus described my invention, what I claim as new, and desire to secure by Letters Patent, is—

1. A bicycle tool bag, open at the top, and having grooved or recessed ends, into which the rod of the bicycle frame, on which the tool bag is supported, is adapted to extend, and a flap cover adapted to extend over said rod, and means for securing said bag to said rod, substantially as set forth.

2. A bicycle tool bag, open at the top, and provided with a flap cover, adapted to extend over the rod to which the bag is attached, and a supplemental flap extending within the body of the bag, and adapted to extend upon the lower or inner portion of said rod, and means for securing said flap to the rod, substantially as shown and described.

3. A bicycle tool bag, open at the top, and having grooved or recessed ends into which the supporting rod is adapted to extend, and a flap cover adapted to extend over the supporting rod, and a supplemental flap extending within the body of the bag, and attached at one edge thereto, and adapted to extend upon the lower or inner portion of the rod to which the bag is attached, and means for securing said flap to the rod, substantially as shown and described.

JONATHAN A. HUNT.

Witnesses:
JOHN C. DEWEY,
KATIE FARRELL.